United States Patent [19]

Mullersman

[11] 4,297,630

[45] Oct. 27, 1981

[54] TIMED FAST CHARGER

[75] Inventor: Ferdinand H. Mullersman, Gainsville, Fla.

[73] Assignee: General Electric Company, Gainsville, Fla.

[21] Appl. No.: 162,152

[22] Filed: Jun. 23, 1980

[51] Int. Cl.³ .............................................. H02J 7/04
[52] U.S. Cl. ....................................... 320/35; 320/23; 320/37
[58] Field of Search ................................... 320/22–24, 320/35, 36, 37, 38

[56] References Cited

U.S. PATENT DOCUMENTS

| | | | |
|---|---|---|---|
| 2,955,245 | 10/1960 | Payne et al. | 320/35 |
| 3,457,489 | 7/1969 | Gentry, Jr. et al. | 320/22 |
| 3,465,230 | 9/1969 | Ball | 320/35 X |
| 3,538,415 | 11/1970 | Wilson | 320/32 |
| 3,681,673 | 8/1972 | Weinstock | 320/36 |
| 3,911,350 | 10/1975 | Swope | 320/22 |

OTHER PUBLICATIONS

Ball, "There's No Overcharge for Fast-Charged Batteries", *Electronics*, Jan. 22, 1968, pp. 97-100.

*Primary Examiner*—Robert J. Hickey
*Attorney, Agent, or Firm*—Morgan, Finnegan, Pine, Foley & Lee

[57] ABSTRACT

In a charger for rechargeable electrochemical cells, a transformer charging circuit supplies a charging current to the battery at a fast charge rate for a predetermined time followed by a continuous slow charge rate. A normally closed automatic reset thermostat in series with the rectifier diodes in the charging circuit, and thermally coupled to them, opens after a period of time, dependent upon the heat generated by the rectifier diodes and upon the thermal mass of the thermostat and diodes, and terminates the fast charge current. A resistor, shunted across the thermostat and thermally coupled to it, establishes a slow charge rate current path when the thermostat opens. Heat generated in the resistor causes the thermostat to remain open as long as the battery is connected and AC power is supplied to the transformer primary winding.

9 Claims, 1 Drawing Figure

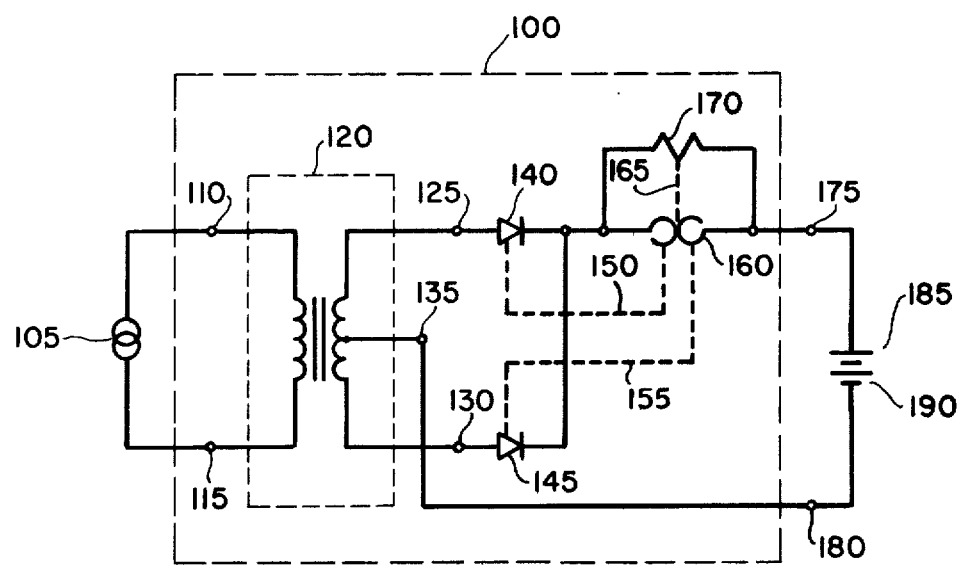

TIMED FAST CHARGER

BACKGROUND OF THE INVENTION

This invention relates to a simple, inexpensive timed fast-rate battery charger. More particularly, it relates to an improved timed, thermostatically controlled fast charger which supplies charging current to a battery load at a fast charge rate for a predetermined time followed by a continuous slow charge rate.

An increasing number of consumer products are operated by one or more rechargeable cells, such as nickel-cadmium cells. These cells are available in many different physical sizes with various electrical charging characteristics. Typical nickel-cadmium cells are capable of being charged at a very high rate.

If the cell characteristics are known, and the state of charge of the cell is known, a timed charge of extremely high rate can be safely put into the cell without risk of permanent damage. Even if the state of charge is not known, it is still possible to safely and reliably inject a significant amount of charge (less than in the known discharged state) at a high rate.

The timed high-rate charge can be applied as an exclusive charge method or can be followed with a slow-rate charge. In the timed approach, a constant-current charging source of appropriate output is connected to the cell through a timed switch. Conventional timed chargers utilize mechanical, thermal, electrical, or even chemical timing methods to control the duration of the fast-rate charging current. Once the timer is actuated, the fast-rate charging current is fed to the cell for a predetermined time, and then interrupted. For example, a completely discharged 1.0 ampere-hour cell in a given application may be fast-charged safely at its 5 C rate, 5.0 amperes, for up to 10 minutes before the timer cuts off its fast charge. The timed-only charge system works best when, in normal use, the device presents an essentially discharged cell to the charger. Under such conditions, the time and rate can be selected to provide a charge which will utilize a significantly high percentage of the cell capacity.

Where the charger application presents a high probability that partially-charged or even fully-charged, cells will be connected to the charger, then the charge (current-time product) must be reduced to a value which a fully charged cell can tolerate without unacceptable compromise of operating life.

Split-rate charging techniques are often used in conjunction with temperature-controlled fast charge rate systems. In the split-rate charging technique utilizing temperature control, the battery is initially charged at a fast charge rate. At an appropriate time, generally at or about the time the cell achieves an overcharged state, the charging rate is switched to a slow-rate. Ideally, the slow charging rate is low enough for the battery to withstand being overcharged at that rate indefinitely.

The primary advantage of the conventional split-rate charging technique is the ability to partially charge a battery in a very short time, often in a matter of several minutes. An important requirement associated with this technique, however, is the necessity of providing some sort of charge control means which effects the transition from a fast charging rate to a slow charging rate if full charge is approached during fast charging. Typically, the charge control means comprises a sensor which may be activated by either voltage, temperature, pressure or a combination thereof.

One type of known split-rate charger is the thermostatically controlled fast charger. Conventionally, this device consists of a constant current power supply and a battery containing a thermostat. The thermostat is usually attached to, or placed in the vicinity of, a cell in the battery and responds to the temperature rise in the cell itself as it approaches the fully charged state. Initially the thermostat is closed to provide a fast charge rate current path. At a given temperature, it automatically opens, to disconnect the fast charge rate current path. Thereafter, the charger normally switches to a slow charge rate. As a result of the problem of oxygen and/or hydrogen generation when charge rates exceeding 4 C are utilized to attain a temperature rise in the cell adequate to operate the thermostat reliably, such chargers are limited to operation at charge rates not exceeding 1.5 C (40 minutes). For many applications this charge rate limitation may be significant.

Another conventional approach provides timed fast charging by utilizing the heat generated by the fast charge rate current flowing through a low value resistor to control the operation of the thermostat. At a given temperature, the thermostat automatically opens, and switches a high value resistor shunted across the thermostat in series with the low value resistor. Thereafter, the series combination of the two resistors provides a slow charge rate current path. A primary disadvantage in the approach is that the heat power input to the thermostat from the low value resistor is proportional to the square of the fast charge current. This means that for a timing system, essentially adiabatic during fast charging, the charge input to the battery would increase linearly with time, whereas the fast charge time to the opening of the thermostat would be inversely proportional to the square of the current. Thus, variation of unregulated charge current over a range of line voltage and battery voltage would be a major contributor to charge input variability. Again, this drawback may be significant in many applications.

It is a general object of the present invention to provide a split-rate charger which is not accompanied by the limitations and drawbacks, outlined above, associated with conventional thermostatically timed fast chargers.

It is a further object of the invention to provide a simple, low-cost charger for providing a sequential timed fast-rate charging mode and a slow-rate charging mode. The chargers in accordance with the present invention provide a reliable switching mode between charging rates, and do so at costs which make them useful in the consumer market where economy of manufacture is so important.

SUMMARY OF THE INVENTION

The charger described below generally may be characterized as charging apparatus for a rechargeable cell having a sequential timed fast-rate charging mode and a slow-rate charging mode. It comprises: means adapted for connection to an external electrical source including rectifying means for providing a source of unidirectional charging current; and thermally activated charging control means connected in series between the charging current means and the rechargeable cell and including (a) first control means thermally coupled to the rectifying means for providing and maintaining for a predetermined period of time a fast-rate charging current path between the charging current means and the rechargeable cell; and (b) second control means connected in parallel with, and thermally coupled to, the first control means for providing thereafter a slow-rate charging current path between the charging current means and the rechargeable cell.

BRIEF DESCRIPTION OF THE DRAWING

The drawing is a schematic diagram of the preferred embodiment of a controlled fast charger, thermostatically timed, incorporating the present invention.

DETAILED DESCRIPTION OF PREFERRED EMBODIMENT

Referring to the drawing the timed fast charger comprises the elements designated by the numeral 100 and is operative to supply charging current to rechargeable battery 185 connected between positive terminal 175 and negative terminal 180. The battery may be comprised of one or more series-connected rechargeable cells 190.

The charger 100 is connectable to an external source of AC power 105. Primary input terminals 110 and 115 of a voltage transformer 120 connect to the power source 105. Transformer center tap output terminal 135 is connected to the negative terminal 180. Transformer output terminals 125,130 are each connected to the anode of a respective rectifier diode 140,145 of a full-wave rectifier circuit to provide pulsed unidirectional rectified charging current. A parallel network consisting of an automatic reset thermostat 160 and shunt resistor 170 is connected between the common cathodes of rectifier diodes 140 and 145 and positive battery terminal 175. The parallel network establishes one of two charging current paths: (1) a low impedance, fast-rate path through the closed contacts of the thermostat and (2) a high impedance, low-rate path through the shunt resistor 170, it being understood that the resistor 170 is substantially shorted when the thermostat contacts are closed. The impedance of each charging path is selected according to the particular charging application.

First thermal coupling paths 150 and 155 provide thermal coupling between rectifier diodes 140 and 145, respectively, and thermostat 160. Similarly, second thermal coupling path 165 provides thermal coupling between current limiting resistor 170 and thermostat 160.

Upon connecting the rechargeable battery 185 to the positive and negative terminals 175 and 180 as shown, with input terminals 110 and 115 of transformer 120 energized by the AC power source 105, the thermostat 160 is initially normally closed and provides a fast charge rate current path for the rectified current from diodes 140 and 145. The current supplied in this mode may average 5 C for many batteries and would be sufficient to fully charge a completely discharged battery in 12 minutes if applied continuously for that period of time. However, as mentioned above, the fast-rate current is terminated well in advance of that time in order not to drive cells that may be already partially charged into an overcharged condition at the fast-rate.

The fast charge current through rectifier diodes 140 and 145 causes heat to be generated within the diodes. This heat is coupled via thermal paths 150,155 to the thermostat 160. To control the thermal time constant for thermostat 160 to open, the thermal coupling paths 150 and 155 may include heat transfer media in addition to direct contact of the thermostat 160 and diodes. Altering the thermal mass included in the nearly adiabatic rectifier/thermostat/shunt resistor thermal system will alter the time required for the thermostat to open and terminate the fast charge current. Ultimately a temperature is reached at the thermostat where the normally closed contacts of the thermostat 160 open. The short across the current limiting resistor 170 ceases to exist and the charger thereupon continues to supply low-rate current to the battery via that resistor. By employing the rectifying diodes 140 and 145 as the heat source for increasing the thermostat temperature, use is made of components already required in the charging circuit, and the addition of heat generating resistors and the like is therefore avoided. Also, there is additional advantage in avoiding addition of a resistor. The charge current is typically limited in real life by proper selection of transformer wire size. This means the copper cross section can be relatively small thus minimizing the amount of copper required. If resistance is added outside the transformer, the transformer winding cross section must be larger to be able to deliver the same current, that is, in order to keep the circuit resistance from increasing. Another way to look at it is that if one adds external resistance, the transformer must be larger to deliver the extra power that will go to the resistor (supply heat generated there) as the charge current is required to pass through it. From the standpoint of charger performance, use of the rectifying diodes 140 and 145, rather than resistors, for thermostat heating reduces the sensitivity of the charge input to line voltage.

It can be shown for an essentially adiabatic thermal timing system that the charge input $\Delta Q$ to the cell being recharged is substantially independent of line input voltage when the charge current rectifying diodes are the heat source used to increase the thermostat temperature:

$$\Delta Q = I_{ch} \cdot \Delta t$$

where: $\Delta Q$ = charge input
$\Delta t$ = charge time
$I_{ch}$ = charging circuit Assume, for the sake of simplicity, that perfect thermal coupling exists between the heat source and the thermostat and that all thermal mass in the timing system resides in the thermostat:

$$\Delta t = \frac{m \cdot c \cdot \Delta T}{P} \quad \text{where: } m = \text{mass of thermostat}$$

$c$ = specific heat of thermostat
$\Delta T$ = temperature change to open thermostat
$P$ = heat power developed in heat source where:
 m = mass of thermostat
 c = specific heat of thermostat
 $\Delta T$ = temperature change to open thermostat
 P = heat power developed in heat source Also, let the exponential I-V characteristic of the rectifying diode junctions be adequately represented by a voltage drop $V_d$ independent of charge current, often done as a first order approximation and let R equal the value of an alternative resistor that would be used to heat the thermostat. It follows that:

For the case of heating the thermostat with the resistor:

$$P = I_{ch}^2 R$$
$$\Delta Q = I_{ch} \cdot \frac{m \cdot c \cdot \Delta T}{I_{ch}^2 R} = \frac{m \cdot c \cdot \Delta T}{R} \cdot \frac{1}{I_{ch}} = K_1 \cdot \frac{1}{I_{ch}}$$

For diode heating:

$$P = I_{ch} V_d$$
$$\Delta Q = I_{ch} \cdot \frac{m \cdot c \cdot \Delta T}{I_{ch} V_d} = \frac{m \cdot c \cdot \Delta T}{V_d} = K_2$$

It is apparent that the charge input is inversely proportional to charge current when the thermostat is heated by a resistor, but independent of charge current when the thermostat is heated by an ideal diode. Since unregulated charge current will typically change by a factor of 1.5 over the range of line voltage from 10% below nominal to 10% above nominal, diode heating can offer a significant improvement in the consistency of charger performance. This is especially important in achieving low cost timed chargers where there is no electrical, thermal, pressure feedback from the cell to indicate the state of charge.

As noted above, the timed fast charger is designed so that the time to reach the opening temperature of thermostat 160 is dependent upon the heat generated by the rectifier diodes 140 and 145, in conjunction with the composite thermal mass of the thermostat, the diodes, and the shunt resistor 170. Accordingly, by selecting thermostat 160 with specified thermal characteristics and thermally coupling it to the rectifier diodes 140 and 145, it is possible to cause the thermostat to open after a predetermined timed interval of fast charge current. In that regard, it is preferred to utilize a thermostat with a relatively high opening temperature in order to minimize the effects of ambient temperature variations on the fast charge time.

When the heat generated in rectifier diodes 140 and 145 raises the thermostat temperature to the activation temperature, the charger switches from fast charge mode to the slow charge mode in which a low current, at a value of 0.1 C, for example, will be provided via shunt resistor 170. The open circuit voltage of the transformer 120 and the value of resistor 170 are chosen based on desired overcharge current on one hand and the heat loss from the thermostatic timing assembly at a temperature which will assuredly keep the thermostat open to sustain low-rate charging.

By thermally coupling the shunt resistor 170 to the thermostat 160, the heat power generated by the slow charge rate current flowing through the shunt resistor is put to use in maintaining thermostat 160 open until either the AC power source 105 or the rechargeable battery 185 is disconnected. Disconnecting the battery 185 would permit thermostat 160 to cool down and close, thereby initiating a timed fast charge rate when battery 185 is connected again to the charger.

Thermal coupling via the paths 150,155 and 165 is preferably achieved by packaging the rectifying diodes 140,145, thermostat 160 and shunt resistor 170 together and enclosing the package within thermal insulation.

The manner of selecting components for constructing a timed fast charger incorporating the present invention will be appreciated from the following design example, which was assembled to supply a fast charge current of 2 amperes and a slow charge of 150 milli-amperes to two series connected nickel-cadmium cells having a nominal open circuit voltage of 1.25 volts each.

The following components were utilized to implement the circuit illustrated in the figure: transformer 120—EEC number 44-7160; thermostat 160—Portage Electric Products, Inc. (PEPI) type F thermostat opening at 110° C.; rectifier diodes 140,145, General Electric type A14; resistor 170-29 ohms. With a ¼ inch thick layer of mineral type insulation, thermostat temperature rise rates of over 50° C./minute with a charge current of 2 amps were obtained. Thus, for two minute timing, the thermostat temperature would rise to 125° C. from an initial level of 25° C.

Once the thermostat opens, it must be held above its closing temperature by the low rate charge current passing through the shunt resistor 170. Since this must be accomplished even at low line voltage, a significantly higher temperature must be tolerated at high line voltage. The diode is the element in the thermal package that is most sensitive to high temperature, and the maximum temperature tolerable for a glass-packaged diode such as the GE A14, is about 175° C. This upper limit must be considered in designing the charger to be operable at minimum and maximum conditions, which are assumed to be:

| Maximum Conditions |
| --- |
| $V_{line}$ = 127 volts |
| $T_{ambient}$ = 40° C. |
| ΔT (due to transformer core loss) = 15° C. |
| Minimum Conditions |
| $V_{line}$ = 104 volts |
| $T_{ambient}$ = 15° C. |

When the timing function is packaged with the transformer, the thermostat must close when the battery has been disconnected with $T_{ambient}$=40° C. and when the transformer is excited and thus producing core loss heat.

Considering the above factors, the acceptable thermostat closing temperature turns out to desirably lie between 55° C. and 90° C. A low cost thermostat, such as the PEPI type F, is available with an opening temperature of 110° C.±10° C. If the normal temperature of the thermostat at start of fast charging is taken to be the typical 25° C. room ambient plus 15° C. escalation caused by transformer excitation (core loss), or 40° C., then the thermal mass in the thermally insulated package should insure that the heat generated by the diodes with a 2 amp charge rate will raise the temperature of the thermostat by 70° C., which is the difference between 40° C. at the start of and 110° C. at the end of fast charge. With a ¼ inch thickness of 8 to 12 lb/ft³ of Johns-Manville Cerablanket insulation enclosing the thermostat-diode-resistor package, it was found that a 2 amp charge current caused the thermostat temperature to increase from 40° C. to 110° C. in 1.53 minutes. This time period was increased to 2 minutes by adding a steel strip weighing 0.97 grams to the thermal package.

It was also found that the heat required from the low-rate shunt resistor to maintain the thermostat at 95° C. (contacts open) was about 750 mW. In order to obtain this heat power from the low-rate resistor and rectifier diodes at a line voltate of 104 V, with the charge current established as 150 mA at 115 V, the transformer secondary voltage was selected to be about 9.0 V and the low-rate resistor about 29 ohms.

Although the embodiment described above utilizes one technique for implementing the first and second thermal coupling paths, certain modifications and variations thereof are possible. Thus, the above description of the preferred embodiment is exemplary and should not be considered as limiting the scope of the present invention.

What is claimed is:

1. Charging apparatus for a rechargeable cell having a sequential timed fast-rate charging mode and a slow-rate charging mode comprising:
   (a) means adapted for connection to an external electrical source including rectifying means for providing a source of unidirectional charging current; and
   (b) thermally activated charging control means connected in series between said charging current means and said rechargeable cell and including:
      (1) first control means thermally coupled to said rectifying means for providing and maintaining for a predetermined period of time a fast-rate charging current path between said charging current means and said rechargeable cell, and
      (2) second control means connected in parallel with, and thermally coupled to, said first control means for providing thereafter a slow-rate charging current path between said charging current means and said rechargeable cell.

2. Charging apparatus for a rechargeable cell having a sequential timed fast-rate charging mode and a slow-rate charging mode comprising:
   (a) means adapted for connection to an external electrical source including rectifying means for providing a source of unidirectional charging current;
   (b) thermostatic switch means connected between said charging current means and said rechargeable cell and being operable between a normally closed position, wherein fast charging current is supplied to said cell, and an open position wherein said fast charging current is interrupted, said thermostatic switch means being thermally coupled to said rectifying means so as to switch from the normally closed position to the open position in response to the heat generated by said rectifying means; and
   (c) resistance means connected across and thermally coupled to said thermostatic switch means, said resistance means providing a slow charging current to said cell and generating sufficient heat to maintain said thermostatic switch means in the open position upon interruption of the fast charging current.

3. Charging apparatus as recited in claim 2 wherein said rectifying means, said thermostatic switch means, and said resistance means are contained within a thermally insulated package, and wherein said rectifying means is configured to provide sufficient heat to cause said thermostatic switch means to switch from the normally closed position to the open position, and said resistance means is configured to provide sufficient heat to maintain said thermostatic switch means in the open position thereafter.

4. Charging apparatus as recited in claim 3 wherein said thermally insulated package includes thermal inertia means for further controlling the switching of said thermostatic switch means from the normally closed position to the open position.

5. Charging apparatus as recited in claim 4 wherein said thermostatic switch means comprises an automatic reset thermostat; and said rectifying means comprises at least one rectifier diode.

6. In charging apparatus for a rechargeable cell having a sequential timed fast-rate charging mode and a slow-rate charging mode and comprising a transformer and diode rectifying means connected to said transformer for providing a source of unidirectional charging current when connected to an external source, and thermally activated charging control means connected in series between said rectifying means and said rechargeable cell for providing a fast-rate charging current path to said rechargeable cell for a first period of time and a slow-rate charging current path to said rechargeable cell for a second period of time, the improvement comprising:
   (a) thermostatic switch means connected between said charging current means and said rechargeable cell and being operable between a normally closed position, wherein fast charging current is supplied to said cell, and an open position wherein said fast charging current is interrupted, said thermostatic switch means being thermally coupled to said rectifying means so as to switch from the normally closed position to the open position in response to the heat generated by said rectifying means; and
   (b) resistance means connected across and thermally coupled to said thermostatic switch means, said resistance means providing a slow charging current to said cell and generating sufficient heat to maintain said thermostatic switch means in the open position upon interruption of the fast charging current.

7. Charging apparatus as recited in claim 6 wherein said diode rectifying means, said thermostatic switch means, and said resistance means are contained within a thermally insulated package, and wherein said diode rectifying means is configured to provide sufficient heat to cause said thermostatic switch means to switch to the open position, and said resistance means is configured to provide sufficient heat to maintain said thermostatic switch means in the open position thereafter.

8. Charging apparatus as recited in claim 7 wherein said thermally insulated package includes thermal inertia means for further controlling the switching of said thermostatic switch means from the normally closed position to the open position.

9. Charging apparatus as recited in claim 8 wherein said thermostatic switch means comprises an automatic reset thermostat; and said diode rectifying means comprises at least one rectifier diode.

* * * * *